United States Patent [19]

Mito

[11] 4,388,942

[45] Jun. 21, 1983

[54] NOZZLE FLAPPER VALVE

[75] Inventor: Akio Mito, Yokohama, Japan

[73] Assignee: Tokyo Keiki Co., Ltd., Japan

[21] Appl. No.: 225,536

[22] Filed: Jan. 16, 1981

[30] Foreign Application Priority Data

| | | | |
|---|---|---|---|
| Jan. 22, 1980 | [JP] | Japan | 55-6333[U] |
| Jul. 22, 1980 | [JP] | Japan | 55-103761[U] |
| Aug. 7, 1980 | [JP] | Japan | 55-112134[U] |

[51] Int. Cl.[3] .......... G05D 16/00

[52] U.S. Cl. .......... 137/85; 137/82

[58] Field of Search .......... 137/82, 85, 86, 84

[56] References Cited

U.S. PATENT DOCUMENTS

| | | | |
|---|---|---|---|
| 2,813,519 | 11/1957 | Persson | 137/82 UX |
| 3,315,250 | 4/1967 | Higgins | 137/82 |
| 3,455,318 | 7/1969 | Jenney | 137/85 |
| 3,919,923 | 11/1975 | Haigh | 137/82 |

*Primary Examiner*—Alan Cohan

*Attorney, Agent, or Firm*—McGlew and Tuttle

[57] ABSTRACT

A nozzle flapper valve provided with a nozzle, fixed throttle and flapper, characterized in that the flapper is formed to be cylindrical and has the cylindrical peripheral surface positioned on the axis of the nozzle so as to simplify the flapper moving mechanism and to prevent the flapper clearance from being clogged with dust in the fluid.

11 Claims, 12 Drawing Figures

NOZZLE FLAPPER VALVE

FIELD AND BACKGROUND OF THE INVENTION

The present invention relates to nozzle flapper valves.

The nozzle flapper valve is a valve having a function of converting a minute mechanical variation to a large fluid pressure variation and provided with a nozzle a, a flapper b and a fixed throttle c arranged upstream of the nozzle as shown in FIG. 1 and is an oil pressure amplifying device of varying the nozzle back pressure Pn by varying the clearance ΔX between the nozzle a and flapper b. In the nozzle flapper valve, by utilizing the principle that a fluid coming out of an oil pressure source kept under a fixed pressure Ps passes through the fixed throttle c and nozzle a and is discharged out into the atmosphere through the clearance ΔX between the nozzle a and flapper b but, when the clearance ΔX decreases, the resistance to the flow will increase and therefore the flow volume will decrease and, with it, the pressure drop at the fixed throttle c will also decrease and the pressure Pn at the output end d will increase, the output Pn is controlled by moving the flapper b to increase or decrease the clearance ΔX between this flapper and nozzle a.

In such a conventional nozzle flapper valve, the flapper b is formed of a plate-shaped body, has the surface e arranged to be at right angles with the axis of the nozzle a and is intended to have the surface e always kept at right angles or substantially at right angles with the axis of the nozzle a even when the flapper is moved. Therefore, the moving mechanism for the flopper b in the conventional nozzle flapper valve is complicated, requires a very larger power when the valve is large and is hard to digitally control. Further, in such a conventional nozzle flapper valve, as the fluid jetted out of the nozzle a always hits the surface of one place of the flapper b, this place will be likely to wear and, when the valve is used for a long time with the clearance ΔX between the nozzle a and flapper b made narrow, the clearance ΔX will be likely to be clogged with the dust in the fluid so as to be substantially decreased.

SUMMARY OF THE INVENTION

An object of the present invention is to provide a nozzle flapper valve wherein the flapper operating mechanism can be made small and digital control can be made easy.

Another object of the present invention is to provide a nozzle flapper valve wherein the wear of the flapper by the jetted fluid is reduced and the clearance between the nozzle and flapper is prevented from being clogged with dust in the fluid.

Further, another object of the present invention is to provide a nozzle flapper valve wherein the nozzle tip will be prevented from being broken in case it collides with the flapper.

Other objects and features of the present invention will be made clear by the following explanation made with reference to the accompanying drawings showing embodiments of the present invention.

DESCRIPTION OF THE PREFERRED EMBODIMENTS

Figure 1:
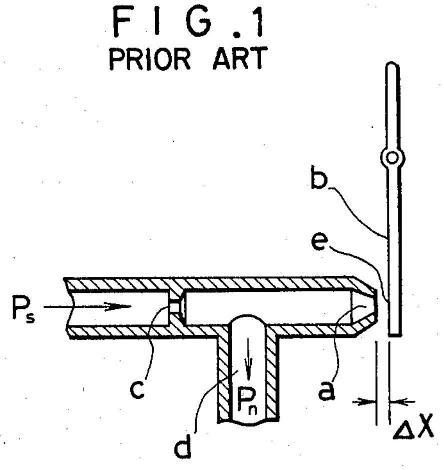
FIG. 1 PRIOR ART
FIG. 1 is a view schematically showing a conventional nozzle flapper valve to explain the principle of the nozzle flapper valve.
Figure 2:
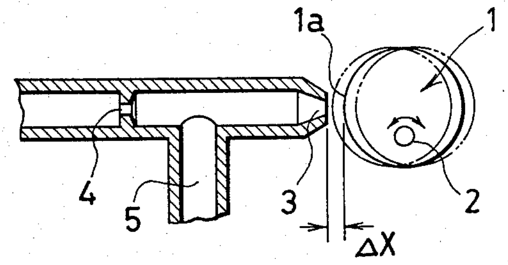
FIG. 2 is a view schematically showing a nozzle flapper valve of the present invention.

FIG. 2 shows a nozzle flapper valve wherein a cylindrical flapper 1 is formed to be cylindrical and a rotary shaft 2 is secured and arranged in an eccentric position with respect to a geometric center of the cylindrical flapper, so as to adust the clearance ΔX between a nozzle 3 and the cylindrical surface 1*a* of the flapper 1 by rotating the rotary shaft 2. By the way, in FIG. 2, reference numeral 4 denotes a fixed throttle and 5 denotes an output port.

Figure 4:
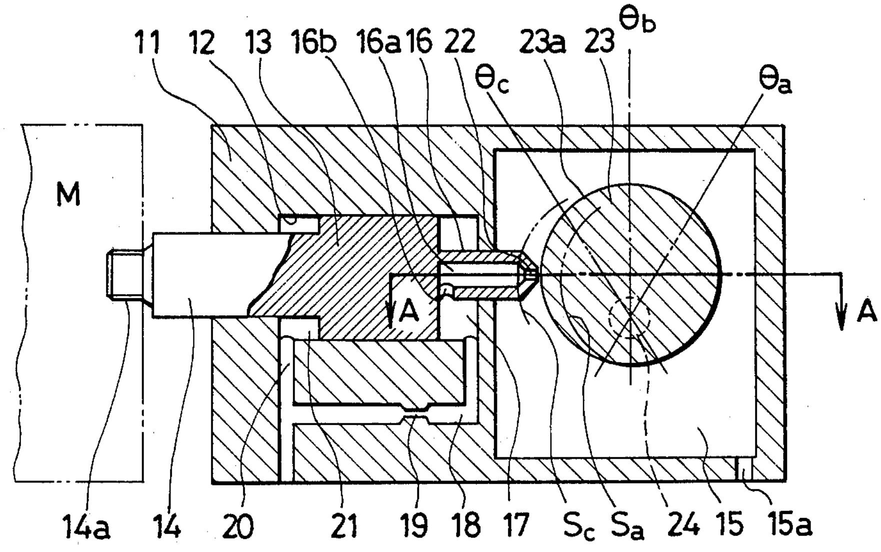
FIG. 4 is a vertically sectioned view of a positioning device utilizing the basic principle of FIG. 2.
Figure 5:
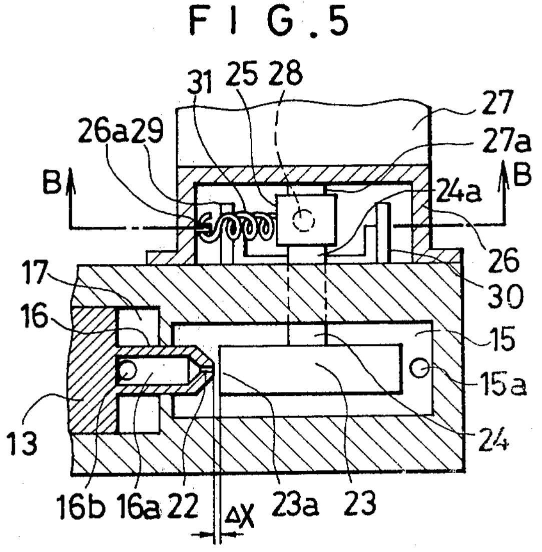
FIG. 5 is a sectioned view on line A—A in FIG. 4.
Figure 6:
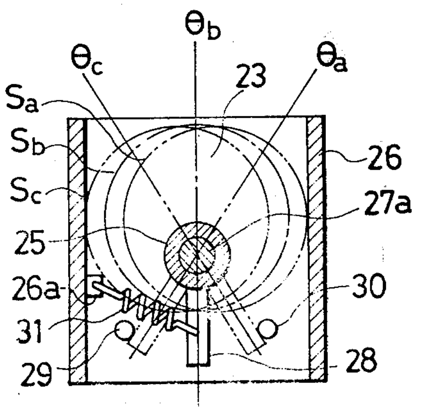
FIG. 6 is a sectioned view on line B—B in FIG. 5.

FIGS. 4 to 6 show a positioning device utilizing such a nozzle flapper valve.

In FIG. 4, a piston 13 having two rods is axially slidably fitted and inserted in a cylinder bore 12 provided within a body 11. The thick rod on one small piston area side of the piston 13 has a fitting screw 14*a* fixed to the tip, extends out of the body 11 as an external rod 14 and has an object M to be positioned connected with it through said screw. The thin rod on the other large piston area side of the piston 13 extends as an internal rod 16 into a drain chamber 15 provided within the body 11 and having a drain hole 15*a*. An internal passage 16*a* is formed in said internal rod 16 and communicates with a cylinder chamber 17 on the large piston area side through a hole 16*b*. The cylinder chamber 17 communicates with a passage 20 communicating with a pressure source not illustrated through a passage 18 formed within the body and a fixed throttle 19 formed within said passage. On the other hand, this passage 20 communicates also with a cylinder chamber 21 on the small piston area side. A nozzle 22 is formed at the tip of the above mentioned internal passage 16*a*.

A cylindrical flapper 23 is supported in the body 11 by a rotary shaft 24 on the axial extension of the thus formed piston. This rotary shaft 24 is arranged in a position deviated from the center of the cylindrical flapper 23 and is connected in the part 24*a* projected out of the body 11 to a shaft 27*a* of a stepping motor 27 mounted on a supporting frame 26 fixed to the body 11 through a joint 26 fixed to the body 11 through a joint 25 as shown in FIG. 5. The joint 25 has a stopper pin 28 projected downward as in FIG. 6 so as to regulate the operating angle range between the rotary angle positions $\theta$a and $\theta$c together with pins 29 and 30 fixed to the body 11. Further, a tension spring 31 is provided between the vicinity of the tip of the stopper pin 28 and a projection 26*a* provided on the supporting frame 26 so as to bias the rotary shaft 24 in the direction in which the flapper 23 separates from the nozzle 22 through the stopper pin 28.

The operation of the above mentioned positioning device shall be explained in the following. A fluid fed under a pressure out of a pressure source not illustrated is fed into the cylinder 21 on the small area side through the passage 20 of the body 11. On the other hand, the fluid in the passage 20 is fed also into the cylinder chamber 17 on the large area side through the fixed throttle 19 and passage 18. The fluid fed into the cylinder chamber 17 is further jetted into the drain chamber 15 out of the nozzle 22 through the hole 16*b* and passage 16*a*. In such case, if the clearance ΔX between the nozzle 22 and the cylindrical surface 23*a* of the flapper is large enough, no large back pressure will be generated in the cylinder chamber 17 and the piston 13 will move rightward in FIG. 4 under the pressure of the fluid fed into the cylinder chamber 21. When the piston moves rightward and the clearance ΔX between the nozzle 22 and the cylindrical surface 23*a* of the flapper 23 reduces, the back pressure within the cylinder chamber 17 will increase with it and therefore, when the clearance ΔX becomes a proper size, the movement of the piston 13 will stop. That is to say, if the fluid pressure fed under a pressure out of the pressure source is always constant, the piston 13 will remain equilibrated where the clearance ΔX between the nozzle 22 and the cylindrical surface 23*a* of the flapper 23 is always constant.

In such state, if a digital signal is put into the stepping motor 27 to rotate the motor, the torque will be transmitted to the shaft 27*a*, joint 25 and shaft 24. Then the stopper pin 28 will rotate from $\theta$a to $\theta$b and $\theta$c counterclockwise in FIG. 6 and, with it, the cylindrical surface 23*a* of the flapper 23 will move from Sa to Sb and Sc and will approach the nozzle 22 in FIGS. 4 and 5. Now, as the pressure fluid is fed through the fixed throttle 19 before the nozzle 22 as described above, as the above mentioned cylindrical surface 23*a* is approached, the pressure in the passage 16*a*, hole 16*b* and cylinder chamber 17 will gradually become high to increase the force of pushing the piston leftward. On the other hand, the pressure fluid is led also into the cylinder chamber 21 to always push the piston rightward. However, as the piston area on the cylinder chamber 17 side is larger than the piston area on the cylinder chamber 21 side, when the clearance ΔX between the top of the nozzle 22 and the cylindrical surface 23*a* reaches a certain value, the forces of pushing the piston 13 respectively rightward and leftward will balance with each other. Further, when the clearance becomes smaller than ΔX, the pressure of the cylinder chamber 17 will become higher to push the piston 13 leftward, therefore the object M connected to the external rod 4 will be moved leftward by the large force amplified by the fluid pressure. Where the clearance becomes ΔX again, the rightward and leftward forces will balance with each other to stop the piston. On the contrary, if the shaft 24 rotates clockwise to separate the cylindrical surface 23*a* of the flapper 23 away from the nozzle 22 and to increase the value of the clearance ΔX, the pressure of the cylinder chamber 17 will reduce under the action of the throttle 19, the piston 13 will move rightward due to the amplified large force and will stop when the clearance becomes ΔX to balance the rightward and leftward forces with each other.

As is clear from the above description, the positioning device of the embodiment shown in FIGS. 4 and 6 is a device wherein, while the clearance from the cylindrical surface 23*a* of the flapper 23 is kept at ΔX, the force will be amplified by the fluid for the piston to follow the flapper 23. Therefore, in the positioning device of the above mentioned embodiment, if the cylindrical flapper 23 is accurately moved by the stepping motor 27, it will not be necessary to rotate the flapper particularly with a large torque and, while keeping the clearance ΔX, the position of the object M connected to the external rod 4 will be able to be strongly and accurately digitally determined. Further, in the case of an electric current suspension or emergency stop, if the excitation of the stepping motor is released, by the action of the spring 31, the stopper pin 28 will stop in contact with the pin 29 and therefore will be able to automatically return to the original point.

As is clear from the above mentioned embodiment, in the nozzle flapper valve according to the present invention, the structure is simple, no component part requires high precision work, an accurate straight line direction positioning can be made by a small digital rotary input means of a small torque and the original point will be able to be returned even at the time of an electric current suspension or emergency stop.

In the above mentioned embodiment, the shaft 24 is connected directly with the stepping motor shaft 27. The speed of the shaft can be increased or decreased through gears however.

Further, it is controllable and general that the ratio of the areas on both sides of the piston 13, that is, the ratio of the cross-sectional areas in the direction at right angles with the axis of the cylinder chambers 17 and 21 is made 2:1. However, even if this ratio is not always 2:1, the operation will be possible.

Further, if the load object M is not fitted to the piston 13 and a spool valve function is added between the cylinder 12 and piston 13, the device will be able to be utilized as an oil pressure controlling valve.

In the present invention, the original point can be returned simply and automatically by a spring and a mechanical stopper mechanism. However, in fact, for example, in case a stepping motor of four phases and a step of 1.8 degrees is used, when four coils A, B, C and D are excited in order, one rotation of 360 degrees will be obtained with 200 steps. Therefore, if the excited coil returned to the original point is made A, the coil A will be excited at 50 points in one rotation. Therefore, in the present invention, the stepping motor is mechanically returned by the spring and stopper near to the inherent original point returning position exciting the coil A. There is an advantage that, if the coil A is excited later, the inherent original point position will be able to be simply returned.

By the way, the original point position has been explained as a in FIGS. 4 to 6. However, it is needless to say that, in the same manner, it is possible also in the position of $\theta$c. However, if the forces of two springs are balanced with each other, even in such intermediate position as $\theta$b, the original point will be able to be returned.

Figure 3:
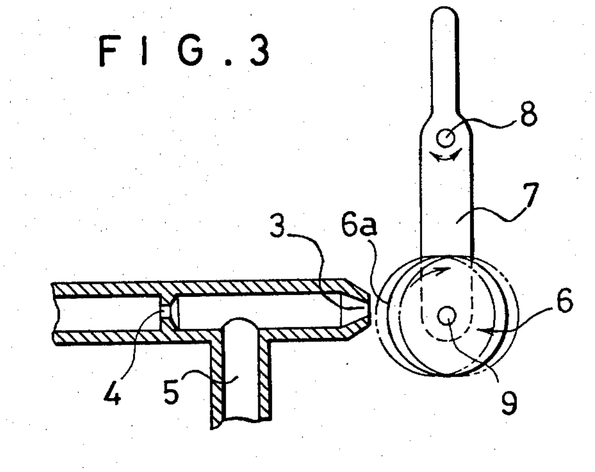
FIG. 3 is a view schematically showing another embodiment of the nozzle flapper valve according to the present invention.

FIG. 3 shows a nozzle flapper valve wherein a flapper 6 is formed to be cylindrical and is rotatably supported at the end 7*a* of a lever 7 and a rotary shaft 8 of said lever is rotated to adjust the clearance ΔX between the nozzle 3 and the cylindrical surface 6a of the flapper 6. By the way, in the same drawing, reference numeral 9 denotes a rotary shaft of the flapper 6. Also, in the same drawing, the elements bearing the same reference numerals as in FIG. 2 are the same elements as in FIG. 2.

Figure 7:
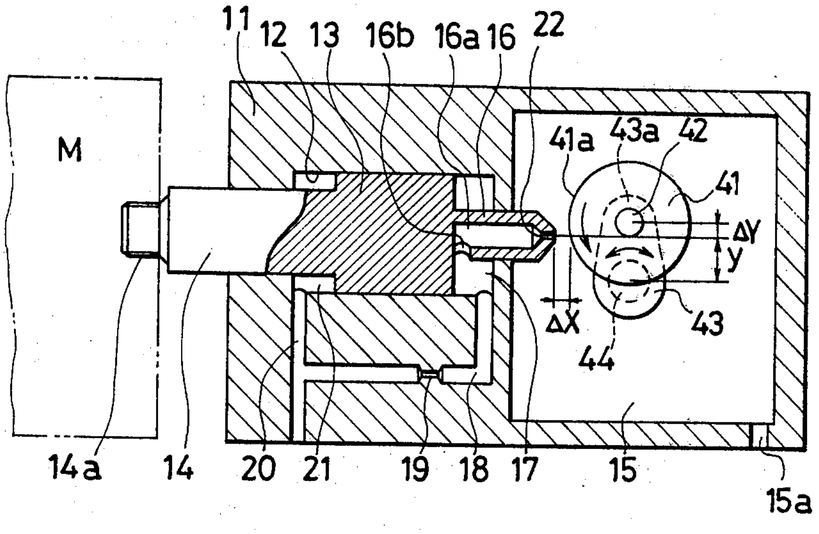
FIG. 7 is a vertically sectioned view of a positioning device utilizing the basic principle of FIG. 3.

FIG. 7 shows a positioning device utilizing such nozzle flapper valve. In this embodiment, all the others than the flapper and its moving mechanism are the same as in the above mentioned embodiment. Therefore, the same reference numerals are attached to the same elements as in the above mentioned embodiment and their operations shall be omitted.

In the device of this embodiment, a flapper 41 is supported at the end 43a of a lever 43 by a rotary shaft 42 and said lever 43 is secured to a rotary shaft 44 which is connected to such rotating means as a stepping motor not illustrated. In the device of this embodiment, the rotary shaft 44 is rotated by such rotating means as a stepping motor to accurately move the rotary shaft 42 and to thereby adjust the clearance ΔX between the cylindrical surface 41a of the flapper 41 and the nozzle 22. Therefore, a proper distance y is set between the center of the rotary shaft 44 and the axis of the nozzle 22 and also a proper distance ΔY is set between the center of the rotary shaft 42 and the axis of the nozzle 22.

The operation of the flapper 41 is the above mentioned embodiment shall be explained in the following. When the shaft 44 is rotated by such rotating means as a stepping motor not illustrated, the tip 43a of the lever 43 will arcuately move around the shaft 44 as a center. With it, the cylindrical flapper 41 supported at the tip 43a of the lever 43 will also arcuately move to increase or decrease the clearance ΔX from the nozzle 22. In the above mentioned embodiment, with the movement of the cylindrical flapper 41, the piston 13 will also move while maintaining the clearance ΔX between the nozzle 22 and the cylindrical surface 41a of the flapper 41. Meanwhile, the fluid jetted out of the nozzle 22 will hit the cylindrical surface 41a of the flapper 41. However, in this embodiment, as the center of the rotary shaft 42 is deviated by the distance ΔY from the axis of the nozzle 22, the flapper 41 will be always rotated by the fluid jetted out of the nozzle 22.

Figure 8I:
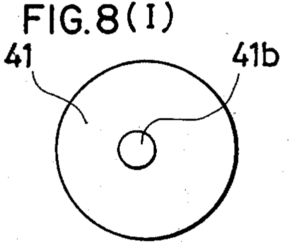
FIGS. 8(I) and 8(II) are views showing the formes of the flapper used in the embodiment in FIG. 7.
Figure 8:
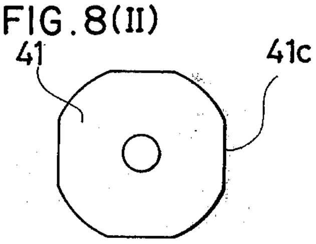

Therefore, in the above mentioned embodiment, dust in the fluid is likely to flow out, even if the clearance ΔX between the nozzle and flapper is small and is used for a long time, such defect that the clearance will be clogged with dust to derange the back pressure Pn of the nozzle will be eliminated and, even if hard dust are contained in the fluid, it will not concentrically hit one place of the flapper 41 and therefore will not corrode it appreciably. Even if a corrosion occurs in a long time, it will be dispersed on the entire periphery of the cylindrical surface and will cause no substantial damage. If the cylindrical flapper 41 is so made by using ball bearings as to hit the jetted fluid against the outer ring, as the surface is hard, it will be practical. Further, if the flapper 41 wherein the center hole 41b is made eccentric with respect to the outer peripheral cylindrical surface as in FIG. 8(I) or wherein the outer peripheral surface is made irregular by providing flat parts 41c as in FIG. 8(II) is used, with the rotation of the flapper 41, the clearance ΔX between the nozzle and flapper will fluctuate around a fixed value as a center, therefore the back pressures of the nozzle, that is, the pressures Pn, Pn-1 and Pn-2 of the output port will also fluctuate around a fixed average value as a center, a socalled dither will be applied and an effect that the load is moved smoothly will be obtained.

Figure 9:
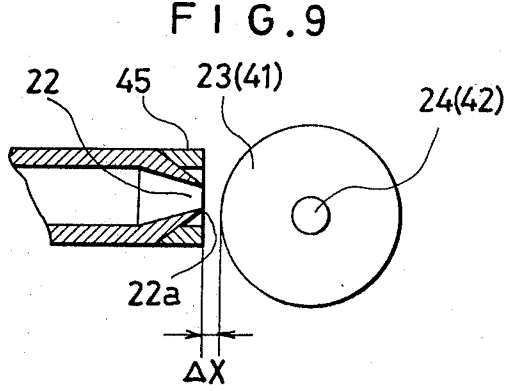
FIG. 9 is a vertically sectioned view showing the nozzle tip shape of the nozzle flapper valve according to the present invention.
Figure 10I:
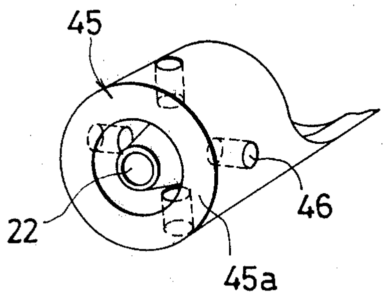
FIGS. 10(I) and 10(II) are perspective views of the formes of nozzles.
Figure 10:
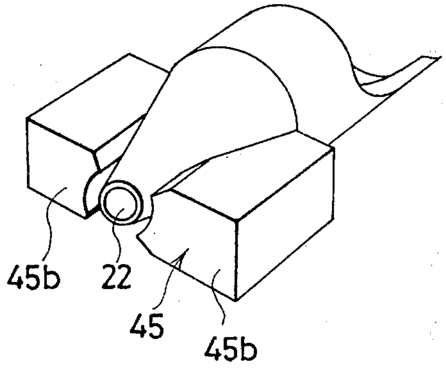

FIGS. 9 and 10 show embodiments wherein a contrivance to prevent the nozzle 22 from being broken is applied to the tip of the nozzle 22. In these embodiments, a pad 45 set in or projected from the same plane as of the tip 22a of the nozzle 22 is arranged around the tip of the nozzle 22. In FIG. 10(I), a pad 45a is arranged over the entire periphery. In FIG. 10(II), pads 45b are arranged in parallel with the shaft 24(42) of the flapper 23(41). By the way, in FIG. 10(I), reference numeral 46 denotes a hole made through the pad 45a.

In the nozzle flapper valve using such nozzle 22, even if the tip 22a of the nozzle 22 collides with the cylindrical surface 23a(41a) of the flapper 23(41), the pad 45 will collide with the flapper 23(41) and will prevent the tip 22a of the nozzle 22 from being broken.

In the general nozzle flapper valve, in the normal operation, the nozzle and flapper will hardly contact strongly with each other but, in case the fed pressure is short, the feedback is delayed by any cause, only the input is put in while no pressure is fed and the flapper is moved manually before the trial operation, the nozzle and flapper may strongly contact with each other to damage the nozzle tip. Particularly, when the flapper is of a cylindrical rotary type, the flapper surface is not flat and the mass is large, the colliding parts will be in line contact and the bad influence will be remarkable.

Therefore, if the nozzle shown in the above mentioned embodiments of the present invention is used, the effect will be very large.

I claim:

1. A nozzle flapper valve comprising:
- a cylindrical flapper (41) having a geometric center and a substantially cylindrical peripheral surface;
- a first rotary shaft (44) connected to said flapper at a location eccentric to said geometric center for movement of said flapper;
- rotating means connected to said first shaft for rotating said first shaft within a selected range;
- a lever (43) connected to said first shaft, said flapper rotatably mounted to said lever about a second shaft, (42) connected to said lever;
- a nozzle (22) having an axis intersecting said peripheral surface and spaced from said peripheral surface by a selected clearance (ΔX); and
- said shaft being positioned and said selected range being chosen so that said geometric center of said flapper is eccentric with said axis of said nozzle by a distance (ΔY) and said clearance (ΔX) is established between said nozzle and said peripheral surface of said flapper.

2. A nozzle flapper valve according to claim 1, wherein said nozzle opens in a plane, including a pad set associated with said nozzle and projecting beyond said plane toward said cylindrical flapper.

3. A nozzle flapper valve according to claim 1, wherein said rotating means comprises a stepping motor connected to said first rotary shaft for rotating said first rotary shaft and adjusting the selected clearance.

4. A nozzle flapper valve according to claim 3, including a spring connected to said flapper for biasing said flapper into a position to maintain a selected clearance when said stepping motor is not energized.

5. A nozzle flapper valve according to claim 1, wherein said cylindrical peripheral surface has at least portions which depart from a right cylinder to form an irregular peripheral flapper surface.

6. A nozzle flapper valve according to claim 1, wherein, said cylindrical flapper is rotatably mounted to one end of said lever about said geometric center, an opposite end of said lever connected to said rotary shaft.

7. A nozzle flapper valve according to claim 1, wherein said cylindrical flapper is rotatably mounted to one end of said lever and on said second shaft at a location eccentric to said geometric center.

8. A nozzle flapper valve according to claim 2, wherein said pad set entirely surrounds a periphery of said nozzle in said plane.

9. A nozzle flapper valve according to claim 2, wherein said pad set extends parallel to the nozzle axis.

10. A nozzle flapper valve according to claim 1, including:

a main body (11) defining a bore (12);

a piston (13) having said nozzle at an end thereof and movable in said bore;

said main body defining a drain chamber (15) with a drain hole (15*a*) communicating therewith, said nozzle and said flapper disposed in said drain chamber;

said bore having a length parallel to said nozzle axis which is longer than said piston along said nozzle axis;

said nozzle forming a large area surface on one end of said piston, said piston connected to a piston rod at an opposite end from said nozzle, said piston rod forming a small area surface on an opposite end of said piston;

said nozzle flapper valve including fluid communication means in communication with said large and small area surfaces of said piston having a fixed throttle (19) in a passage communicating said large and small area surfaces.

11. A nozzle flapper valve according to claim 10 including a supporting frame (26) secured to an outside of said main body (11), a stepping motor connected to said rotary shaft;

a third shaft (27*a*) connected to said first shaft (44), a joint (25) connected to said third shaft, a stop pin (28) connected to said joint, a projection (26*a*) in said supporting frame (26) and a spring (31) connected between said projection and said stopping pin for moving said flapper into an original position after movement of said flapper out of its original position.

* * * * *